(12) United States Patent
Moore

(10) Patent No.: US 6,416,252 B1
(45) Date of Patent: Jul. 9, 2002

(54) IN SITU FORMATION OF PHOSPHATE BARRIERS IN SOIL

(75) Inventor: Robert C. Moore, Edgewood, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/516,481

(22) Filed: Mar. 1, 2000

(51) Int. Cl.[7] .............................. E02D 3/12; B09B 1/00
(52) U.S. Cl. ................... 405/129.45; 405/263; 588/249
(58) Field of Search ............... 405/128.1, 128.7, 405/129.45, 129.6, 129.65, 129.25, 263, 270; 588/249, 250

(56) References Cited

U.S. PATENT DOCUMENTS

| | | | | |
|---|---|---|---|---|
| 4,869,621 A | * | 9/1989 | McLaren et al. | 405/263 |
| 5,139,365 A | * | 8/1992 | Chesner | 405/129 |
| 5,502,268 A | * | 3/1996 | Cote et al. | 588/259 |
| 5,512,702 A | * | 4/1996 | Ryan et al. | 588/256 |
| 5,678,233 A | | 10/1997 | Brown | 588/2 |
| 5,711,015 A | | 1/1998 | Tofe | 588/1 |
| 5,926,771 A | | 7/1999 | Brown | 588/2 |
| 5,961,437 A | * | 10/1999 | Smith et al. | 588/249 |

OTHER PUBLICATIONS

Gauglitz, R, M. Holterdorf, W. Frank, and G. Marx, "Immobilization of Actinides by Hydroxyapatite.", Mat. Res. Symp. Proc. vol. 257 pp. 567–573 (1992).

Jeanjean, J., J.C. Rouchaud, L. Tran, and M. Fedoroff, "Sorption of Uranium and Other Heavy Metals on Hydroxyapatite.", Radioanal. Nucl. Chem. Letters, vol. 201 (6) pp. 529–539 (1995).

Arey, J.S., J.C. Seaman, and P.M. Bertsch, "Immobilization of Uranium in Contaminated Sediments by Hydroxyapatite Addition", Environ. Sci. Technol. vol. 33 pp. 337–342 (1999).

(List continued on next page.)

Primary Examiner—Heather Shackelford
Assistant Examiner—John Kreck
(74) Attorney, Agent, or Firm—Russell D. Elliott (57) ABSTRACT

Reactive barriers and methods for making reactive barriers in situ in soil for sequestering soil ontaminants including actinides and heavy metals. The barrier includes phosphate, and techniques are disclosed for forming specifically apatite barriers. The method includes injecting dilute reagents into soil in proximity to a contamination plume or source such as a waste drum to achieve complete or partial encapsulation of the waste. Controlled temperature and pH facilitates rapid formation of apatite, for example, where dilute aqueous calcium chloride and dilute aqueous sodium phosphate are the selected reagents. Mixing of reagents to form precipitate is mediated and enhanced through movement of reagents in soil as a result of phenomena including capillary action, movement of groundwater, soil washing and reagent injection pressure.

20 Claims, 3 Drawing Sheets

OTHER PUBLICATIONS

Momma, H and T. Kamiya, "Preparation of Hydroxyapatite by the Hydrolysis of Brushite." J. Mat. Sci. vol. 22 pp. 4247–4250 (1987).

Boskey, A.L. and A.S. Posner "Formation of Hydroxyapatite at Low Supersaturation." J. Physical Chem., vol. 80(1) pp. 40–45 (1976).

Madsen, H.E.L. and F. Christensson, "Precipitation of Calcium Phosphate at 40° C. from Neutral Solution." J. Crystal Growth, vol. 114 pp. 613–618 (1991).

Brown, P.W. and M. Fulmer, "Kinetics of Hydroxyapatite Formation at Low Temperature." J. Am. Ceram. Soc., vol. 74(5) pp. 934–940 (1991).

Gabr, M.A., J.J. Bowders, J. Wang, and J. Quaranta, "In situ Soil Flushing Using Prefabricated Vertical Drains." Can. Geotach. J. vol. 33 pp. 97–105 (1996).

Heron, G., M. Van Zutphen, T.H. Christensen, and C.G. Enfield, "Soild Heating for Enhanced Remediation of Chlorinated Solvents: A Laboratory Study on Resistive Heating and Vapor Extraction in a Silty, Low–Permeable Soil Contaminated with Trichloroethylene." Environ. Sci. Technol, vol. 32, pp. 1474–1481, (1998).

Leslie Pearlman, "Subsurface Containment and Monitoring Systems: Barriers and Beyond" U.S. EPA Overview Report—Mar. 1999.

* cited by examiner

IN SITU FORMATION OF PHOSPHATE BARRIERS IN SOIL

This invention was made with support from the United States Government under Contract DE-AC04-96AL85000 awarded by the U.S. Department of Energy. The Government has certain rights in this invention.

BACKGROUND OF THE INVENTION

1. Field of the Invention

This invention pertains generally to in situ formation of reactive barriers in soil, and more specifically the invention relates to in situ formation of apatite barriers for containment of soil contaminants including radionuclides, such as actinides, and heavy metals.

2. Description of the Related Art

Apatite minerals (having, generally, the chemical formula $Ca_5 (PO_4)_3 X$ where X is a halide or hydroxyl) including hydroxyapatite are phosphate mineral chemically and morphologically similar to natural bone. Consequently, hydroxyapatite, for example, is commonly used in medical and dental applications as a synthetic substitute for bone. A number of studies over the past several decades have shown that radionuclides and heavy metals bind onto the surface of apatites in the fashion that they are almost totally immobilized. (Gauglitz, R, M. Holterdorf, W. Frank, and G. Marx, "Immobilization of Actinides by Hydroxyapatite.", Mat Res. Symp. Proc. Vol 257 pp. 567–573 (1992); Jeanjean, J., J. C. Rouchaud, L. Tran, and M. Fedoroff, "Sorption of Uranium and Other Heavy Metals on Hydroxyapatite.", Radioanal. Nucl. Chem. Letters, vol. 201 (6) pp. 529–539 (1995); Arey, J. S., J. C. Seaman, and P. M. Bertsch, "lmmobilization of Uranium in Contaminated Sediments by Hydroxyapatite Addition", Environ. Sci. Technol. Vol. 33 pp. 337–342 (1999)). Consequently, the use of apatites in connection with immobilizing and containing radionuclides around contaminated sites and leaking storage containers has been the subject of active research.

Leakage of radioactive materials from storage tanks and subsequent migration of the radionuclides away from the containment area continues to be a significant unresolved problem at a number of government and private storage sites. Various techniques are used to try to isolate leaking storage containers and contaminated soil to prevent movement of contaminants into uncontaminated soil and especially groundwater.

One approach is simply to attempt to dig up and remove contaminated soil. This, however, is costly, and disturbance of contaminated soil carries the risk that some contaminants will be missed or released and left to migrate further. Excavation also has a negative effect on soil stability. Excessive digging and excavation around waste tanks, for example, has the potential to aggravate waste transport by shaking loose heavily corroded containment drums and already contaminated soil.

Another approach is to establish barriers in the soil of a contaminated site in order to prevent migration of contaminants beyond the barriers. Barriers of this sort that are in use at various sites around the United States and abroad include vertical sleeves placed in trenches surrounding a site. They also include walls formed through the injection of highly pressurized grout in holes drilled in the soil. Emplacement of such barriers typically requires greatly disturbing the soil and often there is no convenient way to create a "floor" or continuous barrier beneath the leaking tank or contaminated region. Consequently, the sequestration of the contaminants is incomplete and contaminants continue to migrate downward and perhaps outward, thereafter. For areas under waste tanks, waste trenches and certain geological formations, forming a continuous barrier is difficult and sometimes impossible.

Various efforts have been made to create reactive barriers which, in addition to forming a physical obstruction to the movement of contaminant substances, actively attract and chemically bind contaminants. Using technology currently available, these chemically active materials can be combined with other components to form slurries that harden in the ground forming reactive barriers. Jet injection processes, for example, are known and used wherein machines pump slurries in holes drilled around the perimeter of a leaking vessel or contaminated site. Additionally, trenches can be dug and backfilled using chemically sorbent materials. Each of these techniques, however, carries the disadvantages previously mentioned relating to significant disturbance of the soil and difficulty in fully surrounding (or encapsulating) a leaking waste tank or region of contaminated soil.

It has been previously shown that mixing calcium chloride and sodium phosphate under basic conditions will yield brushite ($CaHPO_4.H_2O$). Then, the brushite can, over time, slowly change into hydroxyapatite through the mechanism of hydrolysis. (Momma, H and T. Kamiya, "Preparation of Hydroxyapatite by the Hydrolysis of Brushite.", J. Mat. Sci. vol. 22 pp. 4247–4250 (1987); Boskey, A. L. and A. S. Posner "Formation of Hydroxyapatite at Low Supersaturation.", J. Physical Chem., vol. 80(1) pp. 40–45 (1976)) Rapid, in situ formation of apatite in soil, as it is accomplished through the present invention, has not previously been demonstrated.

The need remains, therefore, for reactive barriers wherein apatite is synthesized rapidly in situ, in a way that does not disturb soil in the fashion that prior art methods tend to do, and that provides complete or near-complete containment and immobilization of contaminants present in a contaminated region of soil.

SUMMARY OF THE INVENTION

Therefore, it as an object of the present invention to provide reactive barriers capable of binding and inhibiting migration of soil contaminants including actinides and heavy metals.

It is another object of the invention to provide a method of in situ formation of reactive barriers in soil wherein those barriers include phosphate.

It is another object of the invention to provide barriers, formed in situ, wherein apatite is formed rapidly upon mixing of chemical reactants in soil.

It is yet another object of the invention to utilize capillary action of soil and/or movement of groundwater, and/or soil washing to help mix injected water-soluble reagents to react and chemically form a reactive barrier in the soil, itself.

An advantage of the present invention is that by adequately saturating soil with necessary chemical reagents, the barrier formed using the methods described here will be substantially continuous. Accordingly, a leaking container which is buried, for example, can be substantially encapsulated with apatite.

Another advantage of the present invention is that the processes of the invention can accommodate using low-pressure injection techniques to form the reactive barrier, where minimal disturbance of the soil is needed or desired.

Another advantage of the present invention is that the chemical processes involved are suited also to high-pressure injection of reagents, for circumstances wherein rapid injection is desired or required.

Another advantage of the present invention is that it is economical in comparison with traditional digging and excavation decontamination methods, and no backfilling is required.

These and other objects and advantages of the present invention are fulfilled and satisfied by the claimed invention which includes barriers and methods for making barriers in situ in soil. These barriers, which include reactive phosphate barriers such as apatite, are formed by injecting dilute reagents in soil under conditions of controlled temperature and pH where the reagents migrate through the soil and mix as a result of natural percolation. This mixing is mediated, for example, by capillary action, movement of groundwater, gravity and, where applied, injection pressure. The principles of the invention are suited to allow complete or near complete encapsulation of contaminant sources in soil, as well as to formation of walls or other barrier configurations.

Additional advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

As indicated above, the present invention provides an alternative to current contaminant sequestration or soil removal methods. According to the invention, a truly in situ procedure utilizes, for example, the capillary action of the soil to disseminate and help mix injected water-soluble reagents, which will react and chemically form the reactive barrier in the soil itself. Also according to the invention, mixing can be enabled or enhanced as a result of movement of groundwater in soil or as a result of injection pressure being applied when the reagents are introduced into the soil. According to the principles of the invention, two solutions are introduced into soil around a contaminated site and dispersed through the soil by capillary action and/or ground water movement, or as a result of injection pressure exerted as the solutions are introduced into the soil. The solutions contain chemical reagents which react in the soil and cause precipitation of a specific mineral that is targeted to sequester radioactive materials and heavy metals.

Phosphates, in general, serve to precipitate radionuclides, such as actinides, and heavy metals out of aqueous solution. Calcium phosphates, and in particular apatites, are very well suited to sequestering those contaminants. The method of the present invention involves co-injecting an aqueous phosphate solution with an aqueous calcium solution into soil so that those reactants percolate outward from the point of injection in the soil. Depending on conditions, including the extent to which the reactants are diluted as well as the pH and temperature of the reactants and surrounding soil environment, various calcium phosphate precipitates can be formed rapidly or slowly. For the reasons mentioned above, apatite is a desirable barrier material, and the present invention is especially well suited to the formation of apatite barriers. Other phosphate materials can also have benefit in the context of radionuclide and heavy metal decontamination and sequestration, and the inventive principles of injection and capillary or groundwater dissemination and mixing have application in the context of such other phosphate material, as well.

Phosphates other than apatite have been demonstrated to sequester actinides and heavy metals, and in some circumstances, it may be desirable to deliberately form in the soil calcium phosphates other than apatite. Also, as noted, over time brushite and other calcium phosphates can spontaneously convert into apatite. Apatite, though, is very water insoluble and thermodynamically very stable, and therefore advantageous as a sequestration barrier material because of its resistance to degradation in the presence of natural corrosive elements, including water. Accordingly, in instances wherein apatite is the desired product, there are clear advantages to being able to form in situ apatite directly and rapidly, rather than having to wait for other forms of calcium phosphate material to change into apatite.

The fundamental chemical reaction underlying the formation of in situ apatite barriers of the present invention involves combining a phosphate, such as $Na_3PO_4$, with a salt, such as $CaCl_2$. Conditions of pH, temperature, and reactant dilution affect the rate of reaction and success with which apatite is formed. It has been observed that apatite is a forgiving substance in that strict adherence to stoichiometric proportions is not necessary when combining reactants to form a subterranean barrier, especially where dilute reactants are injected at basic pH and slightly elevated temperature. The use of diluted solutions enables the reactants to penetrate the soil before hardening to form a water penetrable mass of phosphate precipitate, while the mentioned pH and temperature considerations favor formation of apatite over other phosphates.

Scoping studies have indicated that hydroxyapatite can be formed in situ in soil where dilute solutions of sodium phosphate and calcium phosphate are heated and injected. Table 1 illustrates data from three example studies that involved mixing dilute solutions of $Na_3PO_4$ and $CaCl_2$:

TABLE 1

| | Reagent concentration ($Na_3PO_4$) molarity | Reagent concentration ($CaCl_2$ molarity) | Temperture of both reagents | pH after mixing | Solid Precipitate analyzed by XRD the day following reaction (except where noted) |
|---|---|---|---|---|---|
| Study 1 | 0.01–0.1 M | 0.01–0.1 M | 100 C. | 7.2 | 80% hydroxyapatite |
| Study 2 | 0.01–0.1 M | 0.01–0.1 M | 60 C. | 7.2 | 70% hydroxyapatite |
| Study 3 | 0.01–0.1 M | 0.01–0.1 M | 22 C. | 7.2 | <5% hydroxyapatite (increasing to approx. 10% after 2 weeks) |

In each of the studies, at least two experiments were performed using phosphate and calcium solutions having molarities within the ranges noted in the table.

In each of the experiments, the solutions were separately, but simultaneously, injected into a glass column (8 in. diameter×24 in. long) containing soil. Syringes were used to perform injection of the two solutions at points located roughly half way down the soil column and positioned generally opposite each other relative to the cross-sectional diameter of the soil column. For each experiment, two injections of each reagent were perfomed. First, quantities of approximately 50 cc of each reagent were injected via the opposing syringes over a period of about one minute. Then a second round of injections was performed, again using about 50 cc of each reagent, injected over about a minute. In this way, approximately 100 cc of dilute $Na_3PO_4$ and 100 cc dilute $CaCl_2$ combined in the soil interstices. Following injection, it was possible to watch the solutions percolating through the soil column, and a white precipitate was observed to begin to form immediately upon mixing of the two solutions. Although precipitate formed rapidly, it did not, however, immediately create an impenetrable block of precipitate. Rather, even with the precipitate beginning to form, injection continued unhindered and the solutions were still able to freely migrate from the injection points outward thorugh the soil column. After completing each two-stage series of injections, it was apparent that precipitate had begun to form throughout the soil column where mixing of reagents had taken place, and, as noted according to the data shown in the table, significant amounts of hydroxyapatite material was revealed to have formed. (The fraction of precipitate that was not hydroxyapatite comprised, for the most part, calcium phosphate. As recorded in the technical literature, much of that calcium phosphate will change into hydroxyapatite with the passage of time. Madsen, H. E. L. and F. Christensson, "Precipitation of Calcium Phosphate at 40° C. from Neutral Solution." J. Crystal Growth, vol. 114 pp. 613–618 (1991).)

Where reagent concentrations higher than 0.1 M are used, much less hydroxyapatite will form rapidly, and due to the kinetics of the reaction, more intermediate compounds will be formed even at elevated temperatures. Likewise, hydroxyapatite yield, at least in the short term, will generally be less than 1% where lower (<6.8) or higher (>8.5) pH is used.

In the experiments described above, successful rapid formation of apatite generally through the soil can be attributed in part to use of dilute solutions of reagents, and conducting the experiments using pH conditions and temperatures in the ranges discussed. It is also attributable, in part, to the mixing that resulted from the percolation of the reagents through the soil. In this experimental context, the percolation was predominantly caused by capillary action, although pressure exerted though the injection process also contributed to the movement of reagents through the test soil. In a larger-scale situation involving an actual soil contamination problem, percolation resulting in favorable mixing of reagents could occur as a result of capillary action, by reagents being carried through the soil by moving groundwater, by employing a soil washing technique, as described below, or by any combination of these or other mechanisms causing percolation and mixing. Also, injection pressure will affect rate of mixing, however, an advantage of the invention process is that high injection pressures are not necessary for mixing to take place, provided that the soil is not so compacted as to prevent the reagent solutions from soaking through.

Successful formation of apatite in soil can take place under a range of conditions. The invention method of apatite formation in soil is functional (and will create apatite in the soil matrix) using reagent temperatures ranging from 22–100 C, reagent concentrations from ranging from extremely dilute (e.g. <0.00001 M) to about 1 M. (As mentioned, the reaction kinetics at higher molarities will tend to yield intermediate compounds rather than apatite, directly.) Optimal conditions for formation of apatite in soil according to the invention method are: reagent temperature in the range of 40–100 C, reagent concentration <0.1 M, and pH from 7.0 to 8.0. Even higher temperatures can be used successfully, especially where reagents are injected at high pressures.

Phosphate materials other than apatite can likewise be formed in situ in soil using the principles of the invention. Use of dilute reagents and reliance on mixing through capillary action and/or groundwater movement can be advantageous in forming reactive barriers capable of sequestering radioactive contaminants and heavy metals. For example, dilute solutions made from salts of any of the Group IIA elements will form barriers of varying reactivity in soil when mixed with dilute phosphate solutions according to the principles of the invention. Likewise, carbonates of Group IIA elements (e.g. calcium carbonate) can be used successfully according to the invention.

In applying the method to actual cases of soil contamination, especially where apatite reactive barriers are desired, it will be necessary to ascertain the temperature and pH characteristics of the target soil prior to injection of reagents. Using that information, it is possible to adjust the reagent formulations and conditions so that they exhibit desired pH and temperature characteristics according to the invention as the reagents pass through the soil and undergo mixing. Likewise, it will be necessary to ascertain and consider physical characteristics of soil including the degree of compaction of the soil and presence of moving groundwater in the soil. This information can be used to appropriately adjust the injection pressure or select a suitable alternate injection method to assure that adequate mixing of reagents takes place throughout a given target area. If, for example, a predominant direction of groundwater flow is apparent, this can be used to advantage in carrying the reagents into a specific soil region wherein a reactive barrier is desired. Following are example embodiments illustrating various approaches to introducing reagents into soil according to the principles of the invention.

FIG. 1 illustrates an embodiment of the present invention wherein a waste tank is encapsulated with phosphate precipitate using principles of the invention. Referring to FIG. 1, a waste tank 15 is shown in side view, buried in soil 2 beneath the soil surface 5. The bold lines in the figure represent boreholes 10 through which chemical solutions are injected from the surface 5. These boreholes 10 need not have a large diameter; rather they need be only of sufficient cross sectional size to permit injection of aqueous solutions into a region in proximity to the waste tank 15, as shown in the figure. Injection may be accomplished by pumping the solutions directly through the boreholes 10, or alternatively, by pumping reactant solutions through injection pipes positioned in the boreholes 10. In any case, the boreholes 10 provide for penetration of the soil from the soil surface 5 to the region proximity to the waste tank 15, as shown. As noted, an advantage of the present invention is that it permits formation of a reactive barrier to sequester contaminants without significant detriment to soil stability. Injection using boreholes 10 as described is consistent with achieving that advantage.

The diameter and other physical characteristics of the boreholes 10 and the method for creating them in the soil will depend on various factors such as degree of soil compaction, physical constituents in the soil, and so forth. Borehole formation could be accomplished as simply as by driving an injection pipe into the ground, if soil conditions will accommodate this. In other instances, it may be necessary to dig or drill to create the necessary boreholes.

According to this embodiment, reactants of suitable pH and temperature (according to the principles explained above) are injected through the boreholes 10. Injections are directed so that when the chemical reactions forming the phosphate precipitate take place, the tank 15 may be substantially surrounded or encapsulated by the products of the chemical reaction products. As noted, when the reactants in aqueous solution enter the soil, they tend to migrate as a result of capillary action through the soil. This capillary action is also responsible for causing the reactants to mix and react in situ thereby causing the formation of the phosphate barrier likewise to form in situ. Likewise, as noted, other factors including injection pressure and groundwater movement contribute to in situ mixing and reaction of the aqueous solutions.

Figure 1A:
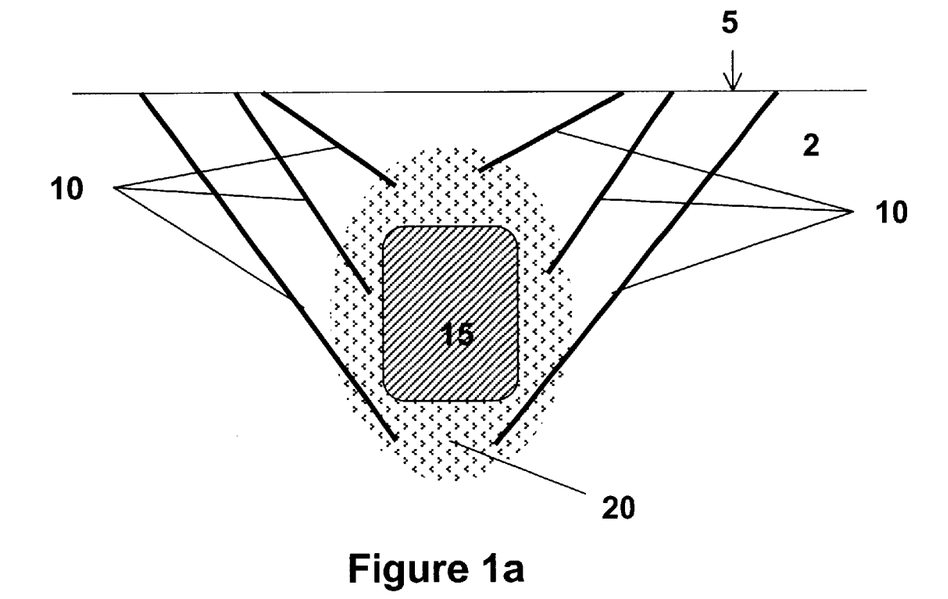
FIG. 1 is a schematic illustration showing top and side views of how chemical solutions are injected into soil around a containment vessel to form a reactive barrier capable of completely surrounding waste.
Figure 1B:
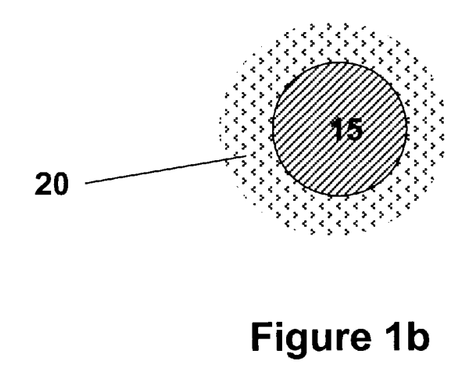

Both in FIG. 1a (cross sectional side view) and FIG. 1b (cross sectional top view), a precipitate barrier 20 is shown which generally surrounds the waste tank 15. It is contemplated that a plurality of boreholes 10 will be used, but the necessary number and orientation of the boreholes 10 will depend on specific circumstances and conditions present concerning, for example, the waste to be encapsulated and the given soil conditions. To achieve optimal sequestration, precise placement of boreholes is not needed so long as qualitatively the precipitate barrier 20 that is formed substantially encapsulates the material sought to be sequestered.

In the illustrations just described, a leaking waste tank is shown, however, the principles of the invention are equally applicable where a plume of actinides or heavy metals, for example, is present in the soil. Due to the reactive nature of the barrier formed (for example, using apatite), movement of contaminants can be arrested, and effective sequestration can be accomplished in a wide range of instances where the barrier is formed in situ around and even in the midst of contaminant species.

Figure 2:
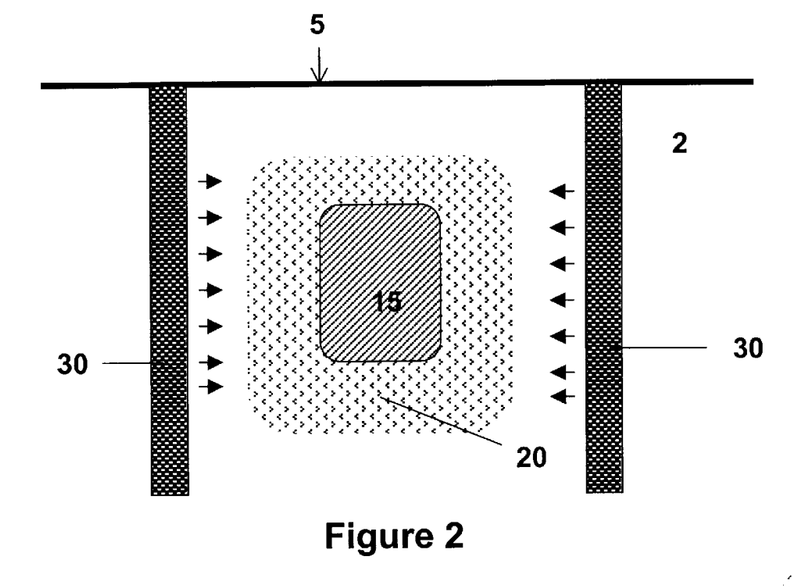
FIG. 2 is a schematic illustration showing an alternative to the embodiment shown in FIG. 1 but wherein encapsulation of a waste source can still be accomplished.

FIG. 2 shows another embodiment of the present invention. In this instance, pipes 30 having holes though which reactant solutions can pass are either buried or driven into the ground in proximity to a contaminant source such as a waste tank 15. The chemical reactions performed in this embodiment are identical to those previously discussed. In this embodiment, the delivery of the reactants, however, is slightly different. Again, though, capillary action of the soil, groundwater movement, and injection pressure, either separately or in combination, cause reactants to percolate through the soil. In the example illustrated in the figure, the direction of percolation of reactants can be controlled to some degree. The arrows shown in the figure illustrate a predominant direction of flow resulting, for example, from openings being selectively oriented in the pipes 30 to favor injection toward the waste tank 15. This results in formation in situ of a barrier 20.

Figure 3:
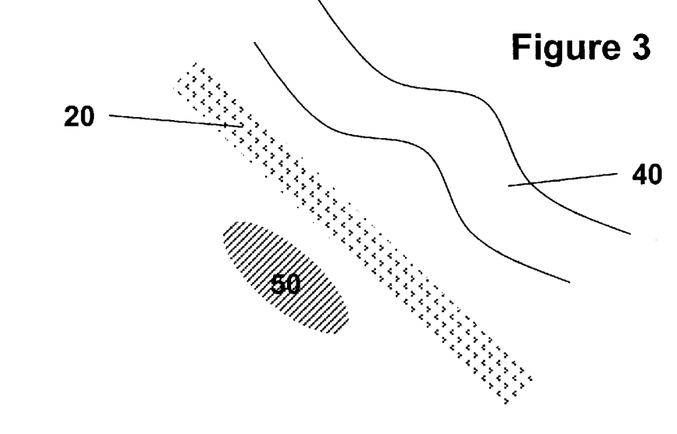
FIG. 3 is a schematic illustration of application of the inventive principles for the purpose of creating a horizontal barrier on one side of a waste source.

FIG. 3 illustrates an embodiment wherein the chemical reaction and injection principles described in the disclosure can be used to form a wall, for example, to obstruct migration of contaminants. In the illustration, contaminants from a plume 50 (such as in a waste trench) or other contaminant source pose a risk associated with movement toward water such as a stream or river 40. In the illustrated example, a barrier 20 is interposed between the plume 50 and a river 40 according to the same principles described elsewhere in the present application. This embodiment illustrates that although the method of the present invention is especially suited to sequestration of contaminant sources by encapsulation, in situ formation of phosphate barriers (especially apatite) according to the principles of the invention can be of benefit even where other barrier configurations, like walls, are used. Depending on the injection techniques used and the barrier required or desired, walls or this sort may be created at various depths. The invention method is well suited to forming barriers at depths in excess of 30 feet, for example, where digging traditional trenches (and then filling them with a barrier material) to isolate waste is not a favored approach or perhaps even feasible. Problems with trenches of such depth result because they may need to be very wide depending on soil conditions in order to satisfy engineering and safety considerations. Costs and safety risks, including those associated with radiation hazard, are likely to be significant when such large trenches are dug. The barrier formation method of the present invention is not subject to geometric limitations of the sort associated with trenches.

Figure 4:
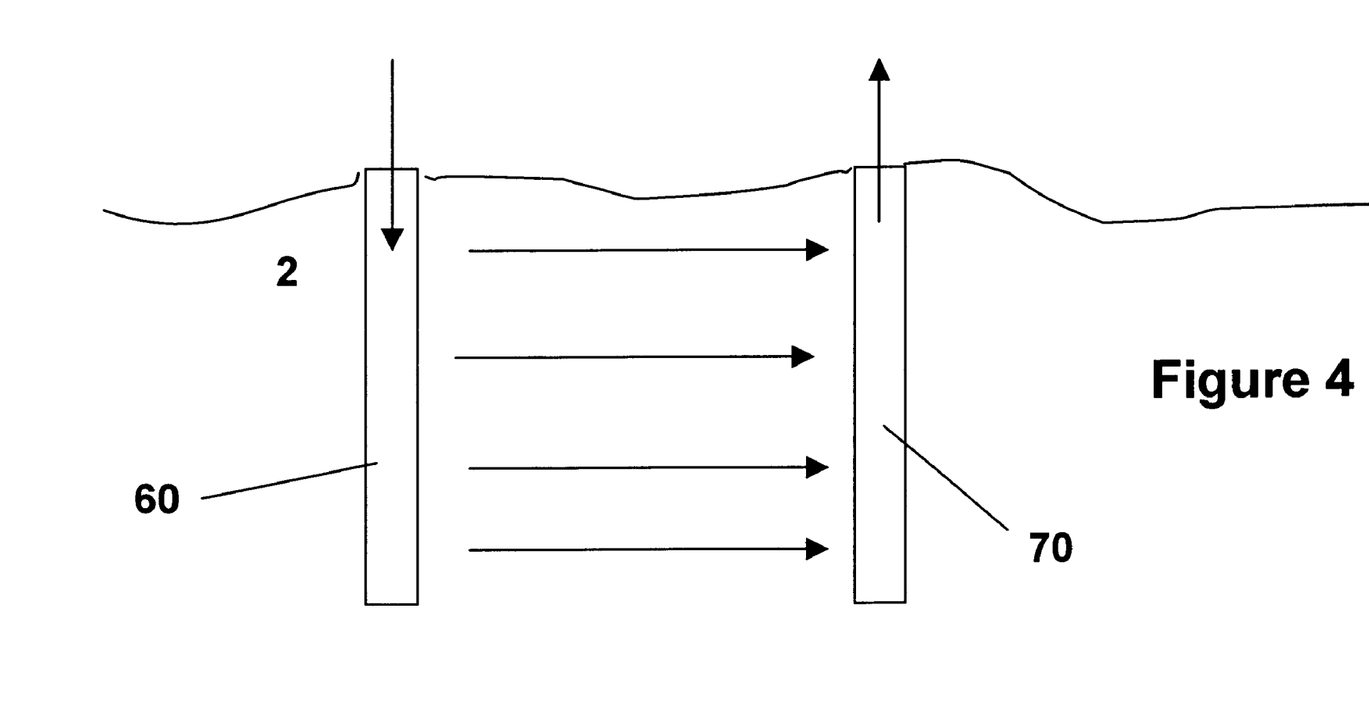
FIG. 4 is a schematic illustration showing an alternative to the embodiments shown in the other illustrations, but wherein a soil washing technique is used to form a barrier in situ in the soil.

FIG. 4 illustrates an embodiment of the present invention wherein construction of the reactive phosphate barrier is accomplished using a modification of an in situ soil washing technique. In situ soil washing involves introducing a washing reagent into the soil through a borehole or pipe placed vertically into the soil. The reagent travels through the contaminated soil reacting with or dissolving the contaminant and is recovered at another bore hole or steel pipe placed some distance away. Pumping or placing a vacuum at the recovery site is used to remove the reagent and contaminant. (Gabr, M. A., J. J. Bowders, J. Wang, and J. Quaranta, In situ Soil Flushing Using Prefabricated Vertical Drains. J. Can. Geotech, 33, pp. 97–105, 1996.)

Referring to FIG. 4, which is a schematic of the modified process for constructing an apatite barrier, an injection well 60 and one or more recovery wells 70 are placed in the soil so that between them is a region of soil wherein barrier construction is to be accomplished. (Note that the Figure illustrates only a single injection well and a single recovery well. As will be described, the principles of this method can be extended to form a progressively larger wall.) According to one approach using this soil washing technique, one of the reagents (for example, dilute calcium-containing solution) is injected into the injection well 60 while suction is applied via the recovery well 70. In this way, the calcium solution is drawn through the soil 2 in the direction shown by the horizontal arrows in the Figure, and then a part of that solution is slowly removed through the recovery well 70. Once the ground between the injection and recovery wells 60, 70 is at least partially saturated with solution, the other reagent (for example, dilute phosphate-containing solution) is pumped in a similar fashion through the system. Using this technique, the reagents mix in the ground along the path between the injection well 60 and the recovery well 70 forming, for example, apatite and other intermediate phosphate compounds in situ in the soil region between the two wells. As indicated, as well, above, it may be desirable to have multiple recovery wells for each injection well, depending on the area of soil sought to be saturated with solution. Additionally, a series of injection and recovery wells can be used to construct a continuous reactive barrier. For instance, wells can be arranged in a line generally describing the boundary of a desired barrier. Then, after one injection/recovery cycle has been completed with both reagents (with barrier having been formed therebetween), another cycle can take place, with, for example, the previous recovery well serving as a new injection well, and the next adjacent well serving as a new recovery well. Using a soil washing technique, in situ barrier formation can result in a somewhat precisely defined barrier than would generally be created relying only on capillary mixing, groundwater movement and simple injection pressure (discussed previously in this disclosure).

Extending the principles just described regarding injection and recovery wells, it is noted that heat (consistent with the temperature ranges noted throughout this disclosure) can be applied to increase the rate of apatite formation. Heat can be introduced to system using metal pipes (for example, as may be used according to the configurations illustrated in either FIG. 2 or FIG. 4). For example, by applying a current between two wells such as in FIG. 4, the ground is heated by resistance. The reagent solutions, electrolytes, for forming the barrier will aid in the process by conducting electricity between the wells. (Heron, G., M. V. Zutphen, T. H. Christensen, and C. G. Enfield, Soil Heating for Enhanced Remediation of Chlorinated Solvents: A Laboratory study on Restive Heating and Vapor Extraction in a Silty, Low-Permeable Soil Contaminated with Trichloroethyene. Environ. Sci. Technol. 1998, 32, pp. 1474–1481)

Finally, it is noted that although the previously described embodiments focus on actively injecting reagents into the soil (albeit, even at low pressure), the necessary mixing in situ can occur likewise in instances where reagents are simply poured on the surface of soil. This is because many of the physical principles causing percolation of reagents through soil apply regardless of whether the reagents are actively or passively introduced into the soil. Therefore, it is anticipated that certain applications wherein the principles of the invention would be advantageous or desirable will include relying on the option of simply pouring reagents in locations where migration of the reagents in the soil will result in the requisite mixing in situ in the soil. Therefore, unless otherwise specified or necessitated by context, the terms inject, injecting and injection are intended to encompass passive methods of introducing reagents into soil including simply pouring them on the soil surface.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

I claim:

1. A method for creating a barrier in situ in soil comprising the steps of:
   injecting into soil, at a first locus in said soil, a first aqueous solution comprising phosphate, and
   injecting into said soil, at a second locus in said soil different from said first locus,
   a second aqueous solution comprising a Group IIA element,
   whereby said first aqueous solution and said second aqueous solution mix at an intermediate location between said first locus and said second locus to form a barrier.

2. The method of claim 1 wherein said barrier comprises apatite.

3. The method of claim 1 wherein the first solution comprises sodium phosphate.

4. The method of claim 3 wherein the second solution comprises a compound selected from the group consisting of calcium chloride and calcium carbonate.

5. The method of claim 4 wherein sodium phosphate concentration is in the range of about 0.00001 M to about 1M and the concentration of the compound selected from the group consisting of calcium chloride and calcium carbonate is in the range of about 0.00001 M to about 1M.

6. The method of claim 5 wherein pH of both the first and second solutions is in the range of about 5 to about 10.

7. The method of claim 6 wherein the temperature of the first and second solutions is in the range of about 22 C to about 100 C.

8. The method of claim 5 wherein pH of both the first and second solutions is in the range of about 7 to about 8.

9. The method of claim 8 wherein the temperature of the first and second solutions is in the range of about 40 C to about 100 C.

10. The method of claim 9 wherein said injecting of said first aqueous solution and said injecting of said second aqueous solution is achieved by a method selected from the group consisting of pouring said solutions on the surface of the soil, injecting said solutions through at least one hole formed in the soil, injecting said solutions though at least one open-ended pipe emplaced in the soil, injecting said solutions through at least one porous structure emplaced in the soil, and any combination of the foregoing.

11. A barrier formed by a process comprising the steps of:
    injecting into soil, at a first locus in said soil, a first aqueous solution comprising phosphate, and
    injecting into said soil, at a second locus in said soil different from said first locus,
    a second aqueous solution comprising a Group IIA element,
    whereby said first aqueous solution and said second aqueous solution mix at an intermediate location between said first locus and said second locus to form a precipitate.

12. The barrier of claim 11 wherein said precipitate comprises apatite.

13. The barrier of claim 11 wherein the first solution comprises sodium phosphate.

14. The barrier of claim 13 wherein the second solution comprises a compound selected from the group consisting of calcium chloride and calcium carbonate.

15. The barrier of claim 14 wherein sodium phosphate concentration is in the range of about 0.00001 M to about 1M and the concentration of the compound selected from the group consisting of calcium chloride and calcium carbonate is in the range of about 0.00001 M to about 1M.

16. The barrier of claim 15 wherein pH of both the first and second solutions is in the range of about 5 to about 10.

17. The barrier of claim 16 wherein the temperature of the first and second solutions is in the range of about 22 C to about 100 C.

18. The barrier of claim 15 wherein pH of both the first and second solutions is in the range of about 7 to about 8.

19. The barrier of claim 18 wherein the temperature of the first and second solutions is in the range of about 40 C to about 100 C.

20. The barrier of claim 19 wherein said injecting of said first aqueous solution and said injecting of said second aqueous solution is achieved by a method selected from the group consisting of pouring said solutions on the surface of the soil, injecting said solutions through at least one hole formed in the soil, injecting said solutions though at least one open-ended pipe emplaced in the soil, injecting said solutions through at least one porous structure emplaced in the soil, and any combination of the foregoing.

* * * * *